Sept. 9, 1952    R. M. PAGE    2,610,319
RADIO ECHO APPARATUS
Filed Nov. 17, 1942    2 SHEETS—SHEET 1
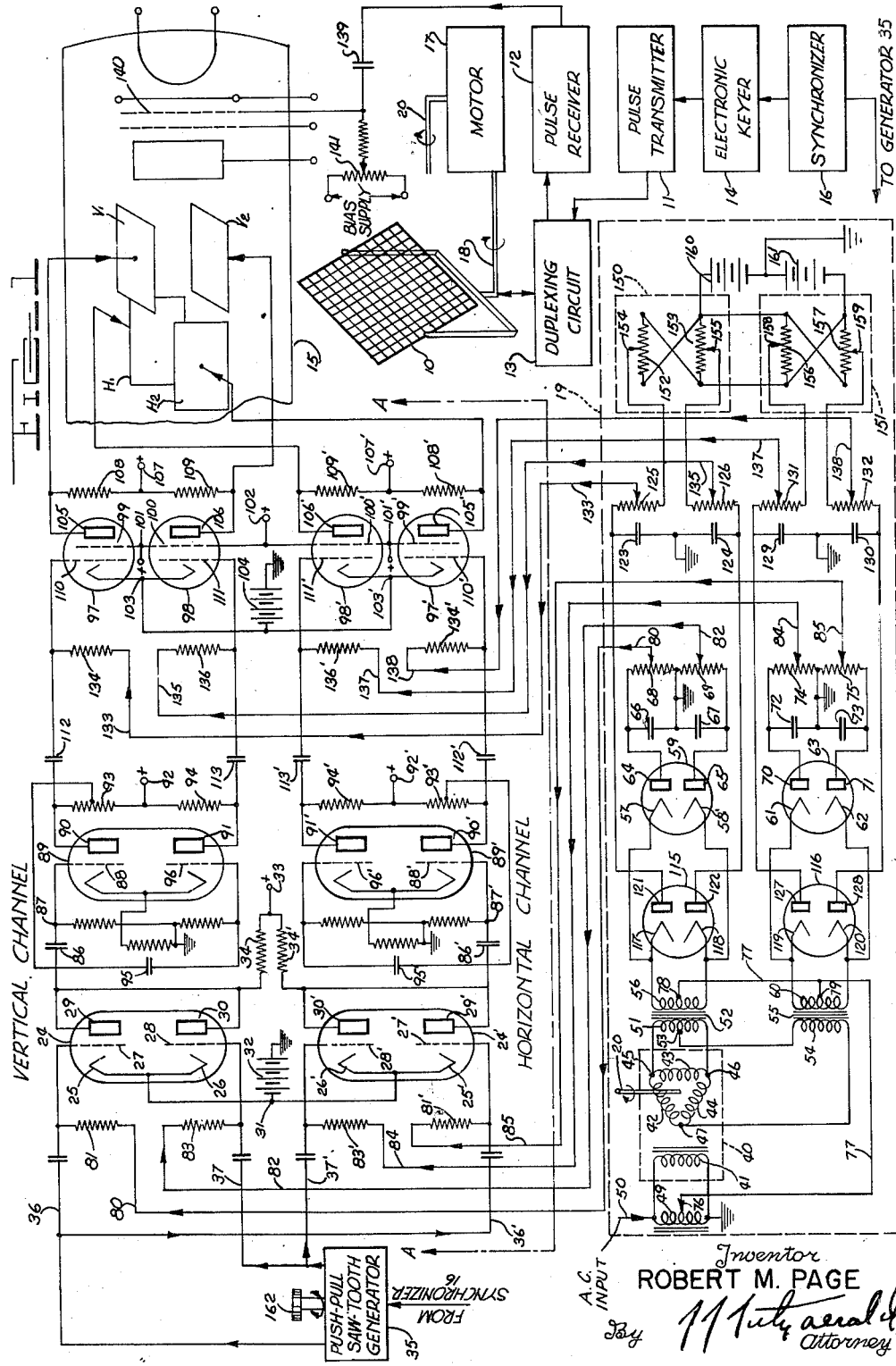
Inventor
ROBERT M. PAGE
By /s/ Attorney Sept. 9, 1952 R. M. PAGE 2,610,319
RADIO ECHO APPARATUS
Filed Nov. 17, 1942 2 SHEETS—SHEET 2
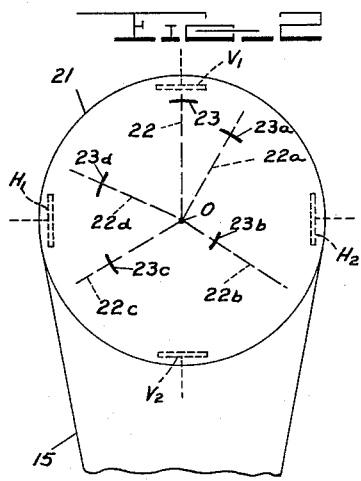
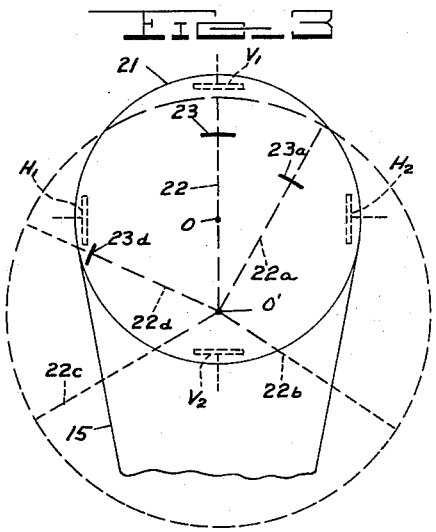
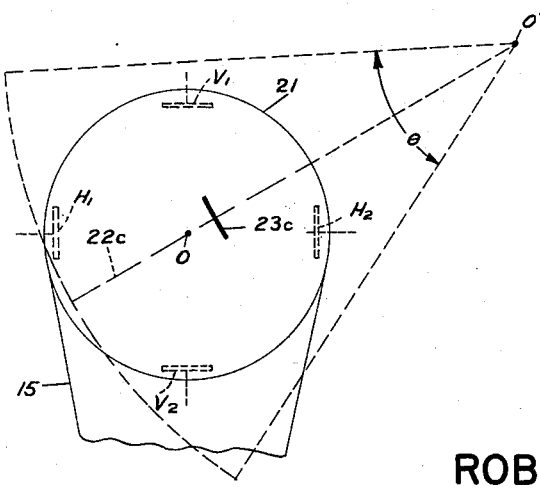
Inventor
ROBERT M. PAGE
By
Attorney Patented Sept. 9, 1952

2,610,319

UNITED STATES PATENT OFFICE 2,610,319

RADIO ECHO APPARATUS

Robert M. Page, Washington, D. C.

Application November 17, 1942, Serial No. 465,919

16 Claims. (Cl. 343—11)

(Granted under the act of March 3, 1883, as amended April 30, 1928; 370 O. G. 757)

This invention relates to radio echo apparatus and more particularly to systems for detecting the presence of remote objects included within a field extending 360° about a reference point and for producing a visual plan position indication of such area, or any preselected portion thereof, whereon indications of detected remote objects are produced in such a manner as to simultaneously show range and direction thereof with a high degree of accuracy.

Radio echo apparatus disclosed by the prior art include a directional beam antenna from which equally spaced energy pulses are emitted at a constant rate, and an indicator, such as a cathode ray tube, upon which a time sweep is impressed in synchronism with the energy pulses emitted from the antenna. When the emitted energy pulses impinge upon remote objects, echo pulses are reflected from the objects and applied to the indicator in such a manner as to produce an indication on the sweep which portrays a measurement of range of the object from which the echo pulse is reflected. In the prior systems directional indications of remote objects detected in the foregoing manner are derived from the angular position of the directional beam antenna. Directional indications obtained in this manner are not of a high degree of accuracy since the directional beam necessarily has a substantial width, approximately equal to an arc of 10 to 15 degrees, and therefore echo pulse indications are produced on the indicator whenever a remote object is included within any portion of the beam. Consequently, it becomes necessary to continually adjust the antenna bearing until echo pulse indications of maximum amplitude are produced, in which case it is assumed that the center of the beam, the portion thereof having maximum power, is directed toward the object, and that the antenna is likewise pointing directly toward the object. The foregoing operations are difficult to perform rapidly with a high degree of accuracy and therefore the prior systems are only capable of producing approximate indications of direction of remote objects.

From the foregoing it can be readily seen that numerous difficulties arise when attempting to determine range and direction of a remote object with a radio echo system of conventional construction. As mentioned heretofore, directional indications, when obtained, are not of a high degree of accuracy, and furthermore, it is extremely difficult to obtain a directional indication of a remote object which corresponds to a remote object indication on the indicator, since means for obtaining range and bearing are isolated, distinct devices. The foregoing defects are more readily comprehended when attempting to determine range and direction of all remote objects included within an area extending 360° about the apparatus. It is necessary, in the latter instance, to slowly rotate the antenna by small increments throughout 360° and to continually record echo pulse indications appearing on the indicator for each position of the antenna. In view of the fact that extremely tedious operations are required to obtain a substantially accurate bearing indication of a single remote object, the fallacies of the foregoing method are obvious, and the same becomes impossible in instances wherein the remote objects are moving at high velocities, such as aircraft for example.

It is therefore an object of the present invention to provide a novel method of indicating range and direction of a remote object.

Another object is to provide novel means for indicating range and direction of a remote object.

Another object is to provide novel means for rapidly indicating range and direction of a plurality of remote objects with a high degree of accuracy.

Another object is to provide a radio echo apparatus capable of detecting all remote objects included within a field extending 360° about the apparatus having novel means for producing a visual plan position indication of any preselected portion of such field.

Another object is to provide a radio echo apparatus having means for producing a plan position indication on an indicating area, such as the screen of a cathode ray tube, of an area extending 360° about the apparatus which portrays measurements of range and direction of all objects included within such area, including novel means for centering only a portion of the plan position indication on the indicating area and for expanding such portion to increase the accuracy of the range and directional measurements provided thereby.

Still another object of the invention is to provide a sweep circuit for producing a rotating radial sweep of the electron beam of a cathode ray tube including novel means for varying the point about which the sweep rotates.

Still another object is to provide a sweep circuit for producing a rotating radial sweep of the electron beam of a cathode ray tube whereby a rotating radial trace is produced on the tube screen, including novel means for varying the point about which the sweep rotates and means for expanding the sweep in such a manner that the trace extends to the periphery of the screen notwithstanding the position of the point of rotation.

Still another object is to provide a radio echo apparatus including means for producing, on the receiving screen of a cathode ray tube, a plan position indication of an area extending 360° about the apparatus whereon range and directional indications of all remote objects included in such area are produced, and including novel means for producing an expanded plan position indication of any preselected portion of such area from which measurements of range of remote objects included within such preselected portion are indicated with a high degree of accuracy.

Other objects and features of the invention will appear more fully hereinafter from the following detailed description when considered in connection with the accompanying drawings which illustrate one embodiment of the invention. It is to be expressly understood, however, that the drawings are designed for purposes of illustration only and not as a definition of the limits of the invention, reference for the latter purpose being had to the appended claims.

In the drawings, wherein similar reference characters denote similar parts throughout the several views:

Fig. 1 is a diagrammatic showing, partly in block form, of a radio echo apparatus embodying the principles of the present invention;

Fig. 2 is a showing of the viewing screen of the cathode ray tube indicator disclosed in Fig. 1 with a visual plan position indication of an area extending throughout 360° about a reference point produced thereon;

Fig. 3 is an illustration of the viewing screen of the cathode ray tube indicator having an expanded visual plan position indication produced thereon of an area extending through less than 360°, at a certain angular position, and Fig. 4 is an illustration of the viewing screen of the cathode ray tube indicator having an expanded visual plan position indication produced thereon of an area extending through less than 360° at an angular position different from the angular position of the indication shown in Fig. 3.

In the application of Robert M. Page, Serial No. 455,582, filed August 21, 1942, for Radio Echo Apparatus, a system is disclosed for detecting the presence of all remote objects included within a field extending 360° about the apparatus and for producing a visual plan position indication wherein indications of detected remote objects are shown at certain radial and angular positions with respect to a reference point respectively in accordance with the range and direction of corresponding remote objects with respect to the apparatus. More particularly, means are provided by the aforementioned application for producing a highly directive pulse energy emission which is continually rotated for scanning an area extending 360° about the apparatus so that energy pulses are reflected from all remote objects included within the scanned area in the form of echo pulses, means for producing a radial sweep of the electron beam of a cathode ray tube in synchronism with the pulse energy emission, means for rotating the radial sweep in synchronism with rotation of the directional pulse energy emission and means for receiving the echo pulses and applying the latter to the cathode ray tube in such a manner as to modulate the intensity of the electron beam to produce a visual indication on the cathode ray tube screen. With an apparatus of the foregoing character a visual plan position indication is produced on the viewing screen of the cathode ray tube. Since emission of energy pulses is properly synchronized with radial movement of the electron beam the echo pulse indications produced on the screen appear on the radial sweep a certain distance from the center of the screen that is a direct measurement of range of the remote object from which the echo pulse is reflected, while the angular direction of the radial sweep, at the instant an echo pulse indication appears thereon, is the direction or azimuth angle of the remote object from which the echo pulse is reflected since the directional pulse energy emission and the radial sweep rotate in synchronism. Furthermore, a system constructed in accordance with the aforementioned application not only functions to produce a plan position indication of remote objects included within a field extending 360° about the apparatus, but is also capable of producing a continuous indication of a single remote object at a fixed bearing as well as producing a plan position indication of any preselected section of the area extending 360° about the apparatus.

It is contemplated by the present invention to provide novel means in connection with a radio echo apparatus having the foregoing characteristics for producing an expanded plan position indication of any preselected portion of the area extending 360° about the apparatus so that range and directional indications of remote objects included within the preselected area are readily obtained with an extremely high degree of accuracy. More particularly, means are provided by the present invention for varying the point about which the radial sweep of the electron beam rotates to any position within or outside the cathode ray tube screen and means for increasing the length of the sweep so that the entire diameter of the screen is utilized for indicating range in a preselected direction. With an arrangement of the foregoing type the length of the sweep line may be increased from the normal length thereof, when the latter rotates about the center of the cathode ray tube screen, to approximately four times as great, for example, during the same period of time, so that units of range for a certain length of the sweep line are increased in direct proportion, thus increasing the accuracy of the indications by a corresponding degree.

With reference more particularly to Fig. 1 of the drawings, a radio echo apparatus embodying the principles of the present invention is disclosed therein including a rotatable directional beam antenna 10 constructed in any suitable manner for producing a highly directive beam of energy, a radio frequency pulse transmitter 11 and a radio frequency pulse receiver 12. Transmitter 11 and receiver 12 have connections with antenna 10 through duplexing circuit 13 which automatically functions to form an individual connection between transmitter 11 and antenna 10, and an individual connection between the antenna and receiver 12 for enabling a single antenna to be utilized for transmission as well as reception. Transmitter 11 is designed in such a manner as to respond to operation of electronic keyer 14 to emit radio frequency pulses at a predetermined rate, while receiver 12 is of such construction as to receive and properly amplify echo pulses produced when the transmitted radio pulses impinge upon and reflect from remote objects. Transmitters and receivers of the type employed in conventional television systems are suitable for these purposes. The radio echo apparatus further includes a suitable indicator 15, which may take the form of a cathode ray tube as shown, upon which indications of reception of echo pulses at receiver 12 are produced. In order to produce echo pulse indications on indicator tube 15 as a function of range of remote objects, a suitable sweep circuit is provided for sweeping the electron beam thereof, while synchronizer 16, which controls operation of the sweep circuit and electronic keyer 14, is included for properly synchronizing the radio pulse output of transmitter 11 and the sweep of the electron beam. The sweep circuit is shown as a schematic circuit diagram enclosed by broken lines A—A in Fig. 1 of the drawings, and is referred to throughout the following description as sweep circuit A—A, the construction and operation of which will appear more fully hereinafter. The apparatus is adjusted in such a manner that the electron beam initiates movement in a certain direction at the instant a radio pulse is emitted from the transmitter. Sweep circuit A—A functions to sweep the electron beam at a constant rate for a certain period of time following initial movement and for rapidly returning the electron beam to the original or normal position thereof prior to emission of the next radio pulse from the transmitter. When the pulse from transmitter 11 is emitted from antenna 10 in a direction as to impinge upon a remote object an echo pulse is reflected from such object, received at antenna 10 and passed to receiver 12. The echo pulse is suitably amplified at the receiver and then applied to the indicator tube 15 is such a manner as to modulate the intensity of the electron beam to produce an indication on the sweep of the application thereof. The indication of the echo pulse appears on the sweep a certain distance from the originating point thereof that is a direct measurement of range of the remote object from which the echo pulse reflected, with respect to antenna 10.

As mentioned heretofore, the radio echo apparatus disclosed in the aforementioned application includes means for rendering the apparatus capable of detecting the presence of all remote objects included within a field extending 360° about the apparatus and for producing a visual plan position indication of such detected objects, with the indication of each object so characterized as to simultaneously show range and direction thereof. As shown in Fig. 1, motor 17 is provided for continually rotating antenna 10, by means of shaft 18, to continually scan an area extending 360° about the antenna with the highly directional pulse energy beam emitted from the antenna. As will appear more fully hereinafter, sweep circuit A—A is designed in such a manner as to radially sweep the electron beam of the indicator tube 15 whenever an energy pulse is emitted from transmitter 11, and to respond to the output of variational bias supply 19, which operates in synchronism with rotation of the antenna, through shaft 20, in such a manner as to continually radially sweep the electron beam in a direction corresponding to the direction of pulse energy emitted from the antenna. The construction and operation of variational bias supply 19 is described more fully hereinafter.

With the foregoing arrangement, the electron beam of the cathode ray indicator tube is radially moved in a direction corresponding to the bearing of antenna 10, that is, in the direction that the normal axis of the antenna is pointing, whenever an energy pulse is emitted. The radial movement of the electron beam produces a trace on the cathode ray indicator tube screen that originates at the center of the screen and moves toward the periphery thereof in a direction corresponding to the direction the normal axis of the antenna is pointing, and consequently, since the normal axis of the antenna passes through the portion of the directional energy beam having greatest power, the trace moves in a direction that energy of greatest power is emitted. As will appear more fully hereinafter, the intensity of the electron beam is biased in such a manner that the trace produced on the screen is normally invisible; however, when energy, such as an echo pulse or a noise signal, is applied to the cathode ray tube the intensity of the electron beam is modulated in such a manner as to render the trace visible at the instant the energy is applied. Therefore, visible indications are produced on the screen, whenever echo pulses are applied to the cathode ray tube, each of which occupy a certain radial and angular position with respect to the center of the screen respectively in accordance with the range and direction of the remote object, with respect to the antenna, from which the echo pulse reflected. The foregoing is more readily understood with reference to Fig. 2 of the drawings wherein screen 21 of indicator tube 15 is shown with radial traces 22, 22a, 22b, 22c, and 22d, produced thereon at various angular positions corresponding to similar angular positions of antenna 10 as the latter rotates through a complete revolution, and with echo pulse indications 23, 23a, 23b, 23c, and 23d, produced on corresponding radial traces at various radial distances from the center o of screen 21, in accordance with the range of remote objects from which the echo pulses reflected. It is to be expressly understood therefore, that with a visual plan position indication having the foregoing characteristics, range and direction of all remote objects included within an area scranned by the directional energy from the antenna are simultaneously shown on the screen by a single indication of each remote object. The range of the remote objects is given by a direct measurement of the radial distance from the echo pulse indication to the center of the screen, while the direction of remote objects corresponds to the angular position of the radial trace at the instant an indication is produced thereon.

With reference again to Fig. 1, the cathode ray indicator tube 15 is of conventional design including a pair of horizontal and vertical deflection plates and means for generating a beam of electrons, while sweep circuit A—A is constructed in accordance with the aforementioned application and functions in such a manner as to simultaneously apply push-pull saw-tooth wave forms to each pair of deflection plates and to respond to the output of variational bias supply 19 to vary the phase and amplitude of the saw-tooth wave forms in such a manner as to apply the proper voltages to the deflection plates whereby the electron beam is continually radially moved, upon simultaneous application of saw-tooth wave forms to the deflection plates, in a direction corresponding to the bearing of antenna 10. More particularly, sweep circuit A—A includes a pair of channels, one of which supplies the horizontal deflection plates $H_1$ and $H_2$ of the cathode ray tube, while the other channel provides the proper voltage to vertical deflection plates $V_1$ and $V_2$. Hereinafter, each of the channels is respectively referred to as "horizontal" and "vertical" channels, as shown in the drawing. Also, similar elements of each of the channels have similar reference numerals, with primed numerals designating elements of the horizontal channel. The first stage of the vertical and horizontal channels comprises vacuum tubes 24 and 24' each of which respectively include a pair of cathodes 25, 26 and 25', 26', a pair of control grids 27, 28 and 27', 28', and a pair of anodes 29, 30 and 29', 30'. Cathodes 25, 26, 25' and 26' are connected together at point 31 and are maintained at positive potential from source 32, while anodes 29, 30, 29' and 30' are supplied with a source of high positive potential from point 33 through resistances 34 and 34'. The control grids of tubes 24 and 24' are connected to the output of wave generator 35. Generator 35 is constructed in such a manner as to produce a push-pull saw-tooth output that is fed to the grids of tube 24 through conductors 36 and 37 so that saw-tooth wave forms 180° out of phase are applied to grids 27 and 28, and to the grids of tube 24' by way of conductors 36' and 37' to apply saw-tooth wave forms 180° out of phase to grids 27' and 28'.

In addition to the push-pull saw-tooth input to the grids of tubes 24 and 24', a suitable varying direct current bias is also applied thereto for modulating the amplitudes, and for varying the phases of the saw-tooth wave forms in accordance with rotation of antenna 10. The varying direct current biases are derived from variational bias supply 19 which includes a generator for producing a plurality of sinusoidally varying direct current biases, sinusoidally varying in definite phase relationships, each of which is applied to separate grids of tubes 24 and 24'. The generator is constructed in accordance with the principles disclosed in the application of Robert M. Page, Serial No. 466,290, filed Nov. 20, 1942, now Patent No. 2,541,093 for Voltage Generator and comprises variable coupling transformer 40 which includes stationary coil 41 and inductances 42, 43 and 44, joined together at points 45, 46 and 47 to form a delta connection, which inductances are rotated in synchronism with rotation of antenna 10 through shaft 20. An alternating current input, at audio or power frequencies for example, is applied to coil 41 through transformer 49, the input being applied to one end of the winding of transformer 49, through terminal 50, while the other end of the winding is connected to ground. Points 45 and 46 of the delta connected inductances are connected through suitable slip rings, not shown, to the end terminals of primary winding 51 of transformer 52, while point 47 and midpoint 53 of primary winding 51 are connected to the end terminals of primary winding 54 of transformer 55. The end terminals of secondary winding 56 of transformer 52 are directly connected to cathodes 57 and 58 of rectifier tube 59, while the end terminals of secondary winding 60 of transformer 55 are connected to cathode 61 and 62 of rectifier tube 63. Each of the anodes of the rectifier tubes are connected to ground through a condenser which charges to a value determined by current flow through the associated tubes, while each of the condensers are shunted by a resistance across which the outputs of the generator appear. As shown, anodes 64 and 65 of tube 59 are respectively connected to ground through condensers 66, 67 and resistances 68, 69, while anodes 70 and 71 are connected to ground through condensers 72, 73 and resistances 74, 75, respectively. The generator further includes variable contact 76, associated with the winding of transformer 49, which is electrically connected, by way of conductor 77, to mid-points 78 and 79 of secondary windings 56 and 60, respectively.

Whenever an alternating current voltage is applied to transformer 49 by way of input terminal 50 a pair of alternating current voltages are applied to the cathodes of rectifier tubes 59 and 63. One of the foregoing voltages is a constant alternating current voltage applied by way of conductor 77 and secondary windings 56 and 60, at an amplitude determined by the position of variable contact 76. Such constant voltage is applied to cathodes 57, 58, 61 and 62 in the same phase since conductor 77 is connected to mid-points 78 and 79 of secondary windings 56 and 60. The other voltage is applied to the cathodes from inductances 42, 43 and 44, by way of transformers 52 and 55, the amplitude and phase of which are determined by the angular position of the inductances with respect to coil 41. When the inductances are rotating at constant speed, the alternating current voltages therefrom applied to cathode 57, for example, for a complete revolution of the inductances, have 100% sinusoidally modulated amplitudes through a complete sinusoidal cycle, with the alternating currents applied during one half revolution, or one half the complete sinusoidal cycle, being 180° out of phase with respect to the alternating currents applied during the other half revolution. Consequently, during one half a complete revolution the alternating current voltage aplied to cathode 57 from the inductances is in phase with the aforementioned constant alternating current voltage also applied to the cathode, and 180° out of phase with the constant alternating current voltage during the other half revolution. The voltages applied to cathode 58 during the same revolution of the inductances are similar to the voltages applied to cathode 57, but are 180° out of phase with respect to the former. Moreover, the voltages applied to cathodes 61 and 62 of tube 63 from the inductances are similar to the voltages applied to cathodes 57 and 58, respectively, with the amplitude variations of the voltages applied to the cathodes of tube 63 being in quadrature with the voltages applied to the cathode of tube 59 since the connections from inductances 42, 43 and 44 to transformer 52 are at right angles to the connections from the inductances to transformer 55. The pair of voltages applied to cathodes 57, 58, 61 and 62 are balanced against each other and produce a resultant voltage that is rectified by tubes 59 and 63. The rectified outputs of the tubes are applied to condensers 66, 67, 72 and 73 and a sinusoidally varying direct current is therefore applied across resistances 68, 69, 74 and 75, with the voltage across each resistance varying through a complete sinusoidal cycle upon a complete revolution of inductances 42, 43 and 44; with the voltages across resistances 68 and 69, and across resistances 74 and 75, varying 180° out of phase, and with the voltages generated across the resistances connected to the output of tube 63 sinusoidally varying in quadrature with respect to the voltages appearing across the resistances associated with the output of tube 59. A constant alternating current voltage is applied to transformers 52 and 55 through conductor 77 in order to maintain a direct current output voltage across resistances 68, 69, 74 and 75. The output at resistance 68 is applied to grid 27 of tube 24, by way of lead 80 and resistance 81, while grid 28 of the latter tube is supplied with the voltage appearing across resistance 69 through conductor 82 and resistance 83, and the outputs appearing across resistances 74 and 75 are respectively applied to grids 28' and 27' of tube 24' by way of conductors 84, 85 and resistances 83' and 81'.

Anodes 29 and 30 of tube 24 are connected together and the outputs of the tube are passed through common condenser 86 to point 87, while the outputs at anodes 29' and 30' are applied through condenser 86' to point 87'. The sinusoidally modulated saw-tooth wave forms simultaneously applied to point 87 from anodes 29 and 30 produce a resultant voltage at point 87 which comprises saw-tooth wave forms swinging symmetrically across a line of zero potential, the amplitudes of which are 100% sinusoidally modulated through a complete sinusoidal cycle upon each complete revolution of antenna 10, with the saw-tooth generated during the half the sinusoidal cycle being 180° out of phase with respect to the saw-tooth wave forms generated during the other half sinusoidal cycle. The resultant voltages appearing at point 87', for a similar complete revolution of the antenna, are similar to the aforementioned resultant voltages appearing at point 87, however, for reasons mentioned heretofore, the voltages appearing at points 87 and 87' are sinusoidally modulated in quadrature. Points 87 and 87' are respectively connected to grids 88 and 88' of duplex vacuum tubes 89 and 89' each of which comprise the second stage of the vertical and horizontal channels, respectively. The cathodes of tubes 89 and 89' are connected through resistances to ground, while anodes 90, 91 and 90', 91' are connected to points 92, 92' of positive potential in push-pull relation by means of resistances 93, 94 and 93', 94'. Tubes 89 and 89' are biased for class A operation so that the potential at anodes 90 and 90', and the potentials across resistances 93 and 93', comprise saw-tooth wave forms which swing symmetrically across the average positive potential applied to the anodes from points 92 and 92', the amplitudes and phases of which vary in a manner corresponding to the varying phases and amplitudes of the resultant voltages appearing at points 87 and 87'. The voltage outputs of anodes 90 and 90' are fed by way of resistances 93, 93' and condensers 95, 95' to the other grids 96 and 96' of tubes 89 and 89' respectively. The connections from resistances 93 and 93' are adjusted in such a manner so that the voltages applied to grids 96 and 96' are respectively equal to the voltages applied to grids 88 and 88'. With the foregoing arrangement, tubes 89 and 89' produce push-pull saw-tooth outputs, with the saw-tooth wave forms swinging symmetrically across the average anode potentials, with the amplitudes of the saw-tooth wave forms 100% sinusoidally modulated, 180° out of phase at the anodes of each tube, through a complete sinusoidal cycle upon a complete revolution of antenna 10, and with the saw-tooth wave forms produced during one half the sinusoidal cycle being 180° out of phase with the saw-tooth wave forms produced during the other half sinusoidal cycle. Also, the reasons mentioned heretofore, the push-pull outputs of tubes 89 and 89' are in quadrature with respect to each other.

The outputs of anodes 90, 91 and 90', 91' are applied through individual modulator stages to deflection plates V1, V2 and H2, H1, respectively, of the cathode ray indicator tube 15. The stages associated with the vertical deflection plates include screen grid vacuum tubes 97 and 98 connected in push-pull relation. Screen grids 99 and 100 of tubes 97 and 98 respectively, are connected together at point 101 and are maintained at positive potential by a suitable source 102 applied thereto, while the cathodes of the tubes are connected together at point 103 which is maintained at a suitable potential, by battery 104, for Class A operation of the tubes. Anodes 105 and 106 are connected to point 107 of positive potential through resistances 108 and 109, while the anodes are also respectively connected to vertical deflection plates V1 and V2. Grids 110 and 111 of the tubes are respectively connected through condensers 112 and 113 to anodes 90 and 91 of tube 89 in order to vary the outputs of tubes 97 and 98 in accordance with the push-pull output of tube 89. The modulator stages between anodes 90' and 91' and horizontal deflection plates H2 and H1 are similar to the modulator stages described above and include screen grid vacuum tubes 97' and 98' with the elements thereof, and the circuit elements associated therewith, having primed numerals similar to the numerals designating corresponding elements and associated circuit elements of tubes 97 and 98.

The grids of modulator tubes 97, 98, 97' and 98' are also supplied with a source of sinusoidal varying direct current bias, from variational bias supply 19, for sinusoidally varying the average potentials at anodes 105, 106, 105' and 106', for a purpose that will appear more fully hereinafter. The means included in variational bias supply 19 for supplying the bias to the grids of the modulator tubes comprises rectifier tubes 115 and 116. The cathodes 117 and 118 of tube 115 are connected to the end terminals of secondary winding 56 of transformer 52, while cathodes 119 and 120 of tube 116 are connected to the end terminals of secondary winding 60 of transformer 55. Anodes 121 and 122 of tube 115 are connected to ground through condensers 123 and 124, respectively, each of which are shunted by resistance 125 and 126, while anodes 127 and 128 of tube 116 are connected to condensers 129, 130 and resistances 131, 132 in a similar manner. Direct current sinusoidally varying voltages appear across resistances 125, 126, 131, and 132, which respectively correspond to the voltages generated across resistances 68, 69, 74, and 75, for reasons mentioned heretofore relative to generation of the latter voltages. The output voltage across resistance 125 is applied to grid 110 of tube 97 through lead 133 and resistance 134, while the voltage produced across resistance 126 is fed, by way of conductor 135 and resistance 136, to grid 111 of tube 98, and the voltages generated at resistances 131 and 132 are respectively applied to grids 111' and 110' of tubes 97' and 98' through conductors 137, 138 and resistances 134', 136'. Since tubes 97, 98, 97' and 98' are biased for Class A operation the voltage outputs appearing at the anodes of each of the tubes comprise saw-tooth wave forms swinging symmetrically across the sinusoidally varying anode potentials, with the amplitude of the saw-tooth wave forms 100% sinusoidally modulated through a complete sinusoidal cycle upon each complete revolution of antenna 10. The saw-tooth wave forms generated at each anode during one half a sinusoidal cycle are 180° out of phase with the saw-tooth wave forms generated at the anodes during the other half sinusoidal cycle, while the saw-tooth wave forms at anodes 105 and 105' are at all times 180° out of phase with respect to the saw-tooth wave forms appearing at anodes 106 and 106', and the output of tubes 97' and 98' are sinusoidally modulated in quadrature with the output of tubes 97 and 98.

The outputs at anodes 105, 106, 105' and 106' are respectively applied to deflection plates V₁, V₂, H₂ and H₁ for supplying the proper voltages between the deflection plates to sweep the electron beam of the cathode ray tube in a direction corresponding to the bearing of antenna 10, whenever saw-tooth wave forms are simultaneously applied to the deflection plates. By applying the sinusoidal varying direct current biases to grids 110, 111, 110' and 111' in the proper phase relation with respect to the phase and sinusoidal varying amplitudes of the saw-tooth wave forms also applied to the grids, and by properly adjusting the value of such biases, the electron beam is maintained equally-distant from the deflection plates, i. e., at the center of the screen, at the instant the saw-tooth wave forms originate. With the foregoing arrangement, the electron beam is swept from the center of the screen, upon simultaneous application of saw-tooth wave forms to the deflection plates, thus producing a radial sweep which rotates about a fixed point in synchronism with rotation of antenna 10.

Synchronizer 16 is connected to wave generator 35 in order to control operation of electronic keyer 14 and sweep circuit A—A in the aforesaid manner so that saw-tooth wave forms, and consequently radial movement of the electron beam, are produced in synchronism with the radio frequency pulses at transmitter 11. The echo pulses amplified at receiver 12 are passed through coupling condenser 139 to grid 140 of the cathode ray tube to modulate the intensity of the electron beam. Bias supply 141 is also connected to grid 140 to control the intensity of the electron beam. The bias supply is adjusted in such a manner so that the electron beam normally does not produce a visible trace on the screen and therefore, only indications of noise signals and echo pulses applied to the grid are seen. This arrangement greatly facilitates observations, especially when the radial sweep is rotating at a high rate of speed. The apparatus disclosed in Fig. 1 operates in a manner fully described heretofore to produce a plan position indication as illustrated in Fig. 2 of the drawings.

As previously mentioned, it is an object of the present invention to provide novel means for centering only a portion of the plan position indication on the screen, with the portion corresponding to a predetermined sector of the scanned area, at any angular position about the apparatus, and other novel means for expanding such portion of the plan position indication in such a manner so that the same covers a substantially greater area of the screen. With a radio echo apparatus having the foregoing means range and directional indications of all remote objects included within the preselected sector are obtained with high degrees of accuracy, substantially greater than the accuracy of the indications provided when a plan position indication of the area extending 360° about the apparatus is produced, as shown in Fig. 2.

With further reference to Fig. 1 of the drawings, and more particularly to variational bias supply 19, the foregoing means comprises potentiometer devices 150 and 151 which control the direct current voltages applied to the vertical and horizontal deflection plates, respectively by varying the biases on grids 110, 111, 110' and 111'. Potentiometer device 150 includes resistances 152 and 153 having the opposite ends thereof connected together, as shown, and variable contact members 154 and 155 respectively associated with resistances 152 and 153 and respectively connected to resistances 125 and 126. Potentiometer device 151 is similar to device 150 and includes resistances 156 and 157 having variable contact members 158 and 159 respectively connected to resistances 131 and 132. Corresponding ends of resistances 153 and 156 are connected together, and are supplied with voltage of opposite polarity through suitable connections with batteries 160 and 161. When variable contact members 154, 155, 158 and 159 are equally distant from the ends of the resistance associated therewith, no additional potential is applied to resistances 125, 126, 131 and 132 and a sinusoidally varying direct current bias is applied to grids 110, 111, 110' and 111' that swings across an average direct current voltage value determined by variational bias supply 19. However, when variable contact members 154 and 155 are moved in synchronism to the right, as viewed in the drawing, a bias, of a certain polarity and of a value determined by the extent of movement of contacts 154 and 155, is applied to resistance 125, while a bias of equal value and of opposite polarity is applied to resistance 126. When such biases are applied to resistances 125 and 126 the sinusoidal varying direct current voltages applied to grids 110 and 111 swing across unequal average direct current voltage values. In instances wherein contacts 154 and 155 are moved in the opposite direction, to the left as viewed in the drawing, the biases applied to resistances 125 and 126 are of the opposite polarity from the bias applied when the contacts are moved in the other direction. Potentiometer device 151 operates in a similar manner to vary the average direct current voltage values across which the sinusoidal varying direct current voltages applied to grids 110' and 111' swing. When the sinusoidal varying direct current biases applied to grids 110, 111, 110' and 111' are varied in the foregoing manner, the sinusoidally varying average direct current voltages across which the saw-tooth wave forms applied to the deflection plates symmetrically swing, are varied in a corresponding manner. Therefore, with the foregoing arrangement, when contact members 154, 155, 156 and 157 are at the mid-points of associated resistances, the originating points of the saw-tooth wave forms applied to the deflection plates are maintained at equal potential values and a radial sweep of the electron beam is produced upon simultaneous application of saw-tooth wave forms to the deflection plates, which rotates about the center of the screen in synchronism with rotation of antenna 10 in a manner described heretofore and illustrated in Fig. 2. However, when the average direct current voltages across which the saw-tooth wave forms symmetrically swing are maintained at different values at each of the vertical and horizontal deflection plates, upon movement of contacts 154, 155, 158 and 159, the saw-tooth wave forms applied to the deflection plates originate at points of unequal potential and the sweep of the electron beam rotates about a point remote from the center of the screen determined by the positions of variable contact members 154, 155, 158 and 159.

The foregoing is more readily understood with reference to Figs. 3 and 4 of the drawings wherein the screen 21 is shown with the electron beam rotating about points o' and o'', respectively, remote from the center o of the screen. When it is desired to obtain more accurate range and directional indications of the remote object represented by echo pulse indication 23, for example, potentiometer device 150 is operated in such a manner that the saw-tooth wave forms applied to vertical deflection plate $V_2$ originate at a potential value sufficiently greater than the potential value of the saw-tooth wave forms applied to vertical deflection plate $V_1$ to maintain the electron beam at point $o'$, as shown in Fig. 3, at the instant the saw-tooth wave forms originate. The length of the sweep of the electron beam is then expanded, by increasing the amplitude of the saw-tooth wave forms upon operation of amplitude control 162 of generator 35 as shown in Fig. 1. The amplitude of the saw-tooth wave forms is increased a sufficient amount so that the electron beam is moved the entire distance toward the periphery of screen 21. As shown in Fig. 3, the expanded radial sweep rotates about point $o'$ in synchronism with rotation of antenna 10, and the sweep traverses screen 21 only during a limited time as the same rotates throughout 360°. Echo pulse indications are only produced on screen 21 of remote objects included within an area about the antenna that corresponds to the area of screen 21 with respect to point $o'$. From Fig. 3 it can be seen that the sweep line is expanded to approximately twice the normal length thereof shown in Fig. 2. Since the amplitudes of the saw-tooth wave forms are increased to expand the sweep, the time of the sweep remains constant and therefore the accuracy of range indications obtained from echo pulse indications 23, 23a and 23d increases directly proportional to the increase in length of the sweep.

In Fig. 4 the sweep is shown rotating about point $o''$, outside the screen, and expanded a sufficient amount to provide a more accurate indication of the remote object represented by echo pulse indication 23c. In order to maintain the sweep rotating about point $o''$ potentiometer device 150 is adjusted so that the saw-tooth wave forms applied to vertical deflection plate $V_1$ originate at a higher potential value than the saw-tooth wave forms applied to vertical deflection plate $V_2$, while device 151 is operated in such a manner to vary the biases applied to grids 110' and 111' so that the saw-tooth wave forms applied to horizontal deflection plate $H_2$ originate at higher potential values than the saw-tooth wave forms applied to horizontal deflection plate $H_1$. The sweep is expanded, upon adjustment of control 162, a sufficient amount to utilize the entire diameter of screen 21. Since the sweep is expanded approximately four times the length thereof shown in Fig. 2, the accuracy of the range indication obtained from echo pulse indication 23c is increased a corresponding degree. In order to produce the indication shown in Fig. 4, antenna 10 is continually rotated through angle $\theta$ to continually scan a certain angular area in which the remote object represented by echo pulse indication 23c is included, and the sweep of the sweep of the electron beam therefore necessarily rotates about point $o''$ through an equal angle $\theta$. By operating the apparatus in the above manner extremely accurate range and directional indications of preselected remote objects are obtained without unnecessary use of power. The sweep of the electron beam is shown rotating through 360° in Fig. 3, however this illustration is for purposes of clarity only and does not necessarily represent a preferred mode of operation.

In operation of a radio echo apparatus constructed according to the principles of the present invention, potentiometer devices 150 and 151 are adjusted in such a manner as to maintain the originating points of the saw-tooth wave forms applied to the deflection plates at equal potential, and antenna 10 is continually rotated through 360° whereby echo pulses are reflected from all remote objects included within the area scanned by the directional pulse energy emitted from the antenna. Since the electron beam of the cathode ray indicator tube 15 is radially swept in synchronism with the directional pulse energy emitted from the antenna and since the radial sweep rotates in synchronism with rotation of the antenna, a visual plan position indication of the area extending 360° about the apparatus is produced, as shown in Fig. 2. When it becomes desirous to obtain a more accurate indication of range and direction of any remote object corresponding to a certain echo pulse indication on the plan position indication, potentiometer devices 150 and 151 are adjusted to move the point of rotation of the radial sweep to any desired position in a direction substantially opposite the selected echo pulse indication, and the sweep is expanded upon operation of manual control 162 so that the electron beam moves across the entire diameter of screen 21, in a manner shown in Figs. 3 and 4. When indications of a preselected remote object are only desired, antenna 10 is rotated through an angle enclosing such object, as shown in Fig. 4.

There is thus provided by the present invention a radio echo apparatus capable of producing a plan position indication of all remote objects included within a field extending 360° about the apparatus and for only producing an indication of the remote objects included within a portion of the area extending 360° about the apparatus. The latter means includes novel devices for producing an expanded plan position indication on the entire area of the cathode ray indicator tube screen of any preselected portion or sector of the plan position indication of the area extending 360° about the apparatus. With an arrangement having the foregoing characteristics, range and directional indications of remote objects corresponding to the echo pulse indications included within the expanded plan position indication are obtained with greatly increased accuracy.

Although only one embodiment of the invention has been disclosed and described herein it is to be expressly understood that various changes and substitutions may be made therein without departing from the spirit of the invention as well understood by those skilled in the art. Reference therefore will be had to the appended claims as a definition of the limits of the invention.

The invention described herein may be manufactured and used by or for the Government of the United States of America for governmental purposes without the payment of any royalties thereon or therefor.

What is claimed is:

1. In an apparatus for determining range of remote objects, means scanning an area with a source of directional energy, means receiving energy reflected from remote objects whenever said directional energy impinges upon remote objects, indicating means including an indicating area, means controlling the indicating means responsively to the received energy to produce on the indicating area an indication of the remote objects included within the scanned area, means selecting a portion of said indication for presentation only on said indicating area and means expanding said portion to increase the accuracy of the range measurements provided thereby.

2. In an apparatus for determining range and azimuth of remote objects, means scanning an area with a source of directional energy, means receiving energy reflected from remote objects whenever said directional energy impinges upon the remote objects, indicating means including an indicating area, means controlling the indicating means responsively to the received energy to produce a plan position indication on an indicating area of all remote objects included within the scanned area with respect to a reference point, means selecting a portion of said plan position indication for presentation only on said indicating area and means expanding said portion to increase the accuracy of the range and azimuth measurements provided thereby.

3. In an apparatus for indicating range and azimuth of remote objects, means producing a directional pulse energy emission, means producing a radial sweep of the electron beam of an oscillograph synchronized with said directional pulse energy emission, means receiving pulse energy reflected from remote objects whenever said directional pulse energy emission impinges upon the remote objects, means applying said received reflected pulse energy to said oscillograph to modulate the intensity of said electron beam for producing a visible indication on the oscillograph screen that indicate a direct measurement of range of the remote object from which the pulse energy is reflected, means continually rotating said directional pulse energy emission and said radial sweep in synchronism for producing a plan position indication on said screen which portrays measurements of range and azimuth of all remote objects included within an area extending 360° about a reference point, means centering only a portion of said plan position indication on said screen and means increasing the length of said sweep for expanding said portion to increase the accuracy of the range and azimuth measurements provided thereby.

4. In combination with a cathode ray tube having a screen, sweep means producing a rotating radial sweep of the cathode ray of said tube, and control means for displacing the center of rotation of said sweep to any desired position relative to the center of the screen.

5. In combination, a cathode ray tube having means for generating an electron beam, means producing a rotating radial sweep of said electron beam, means varying the position of the center of rotation of said radial sweep and means expanding the length of said radial sweep.

6. In an apparatus for indicating range and azimuth of remote objects, a cathode ray tube having means for generating an electron beam, means producing a rotating radial sweep of said electron beam, means representing range by a measurement on said sweep, means representing azimuth by the angular position of said sweep, means displacing the center of rotation of said radial sweep and means expanding said sweep to increase the accuracy of the range and azimuth indications.

7. In combination, a cathode ray tube including means generating an electron beam and a plurality of beam deflecting means, a source of saw-tooth wave forms, means applying said saw-tooth wave forms to said deflecting means in certain phase relations, means sinusoidally varying the amplitude of said saw-tooth wave forms in certain phase relations, means applying sinusoidally varying direct current wave forms to said deflecting means in certain phase relations whereby said saw-tooth wave forms swing symmetrically across said sinusoidally varying direct current wave forms to thus produce a rotating radial sweep of the electron beam, means varying the amplitude of said sinusoidally varying direct current wave forms for displacing the center of rotation of said radial sweep and means increasing the amplitude of said saw-tooth wave forms for expanding said radial sweep.

8. In combination, a cathode ray tube including a plurality of deflection plates and means generating an electron beam, a source of saw-tooth varying voltages, means applying said saw-tooth voltages to said deflection plates in certain phase relations, means sinusoidally varying the amplitude of said saw-tooth voltages in certain phase relations, means applying sinusoidally varying direct current voltages to said plates in certain phase relation whereby said saw-tooth voltages swing symmetrically across said sinusoidally varying direct current voltages to thus produce a rotating radial sweep of the electron beam, means varying the amplitude of said sinusoidally varying direct current voltage for displacing the center of rotation of said radial sweep and means increasing the amplitude of said saw-tooth voltages for expanding said radial sweep.

9. In an apparatus for indicating range and azimuth of remote objects, means producing a directional energy emission, means rotating said directional energy emission, a cathode ray tube including a plurality of deflection plates and means for generating an electron beam, a source of saw-tooth varying voltages synchronized with said directional energy emission, means applying said saw-tooth voltages to said deflection plates in certain phase relations, means sinusoidally varying the amplitude of said saw-tooth voltages in certain other phase relations at a frequency corresponding to the rotating speed of said directional energy emission, means applying sinusoidally varying direct current voltages to said plates in said certain other phase relations at said frequency whereby said saw-tooth voltages swing symmetrically across said sinusoidally varying direct current voltages to thus produce a radial sweep of the electron beam that rotates in synchronism with rotation of said directional energy emission, means receiving energy reflected from remote objects, means applying said received reflected energy to said oscillograph to modulate the intensity of said electron beam for producing a plan position indication on the screen of said oscillograph which portrays measurements of range and direction of remote objects included within a field extending 360° about a reference point, means varying the amplitude of the sinusoidally varying direct current voltages applied to said plates for displacing the center of rotation of said radial sweep to center only a portion of said plan position indication on said screen, and means increasing the amplitude of said saw-tooth voltages for increasing the length of said radial sweep to expand said portion thereby increasing the accuracy of the range and azimuth measurements provided thereby.

10. In an object locating system of the type in which an exploratory sharply directive pulsed energy beam is turned to scan an area, reflections of said beam from objects within said area are received, and a pattern of indications is obtained on an indicator in which pattern each object is represented by an indication at an angle from a center point corresponding to its azimuth angle with respect to the position of the exploratory means and at a distance from said center point which is proportional to the object's distance from said exploratory means, means for expanding a portion of said pattern which includes means for displacing the center point of said pattern from the center point of the indicator and means for expanding the radial sweep of said indicating means whereby a desired portion of said pattern in expanded to provide a more detailed view thereof.

11. The arrangement of claim 10 and means for oscillating the exploratory beam of said system through that portion of a complete revolution only for which an expanded pattern is desired.

12. An apparatus for determining range and azimuth of remote objects comprising indicating means including an indicating area, means producing control signals characteristic of the range and azimuth of all remote objects included within a field extending 360° about a reference point, control means for the indicating means operative responsively to the control signals to produce a plan position indication on the indicating area of all remote objects included within said field, selectively operable means controlling said indicating means to select a portion of said plan position indication for presentation only on said indicating area, and means expanding said portion to increase the accuracy of the range and azimuth indications provided thereby.

13. In an echo ranging device, an impulse transmitter adapted to emit a recurrent energy impulse, a receiver for receiving the reflections of said energy impulses, a cathode ray tube indicator means coupled to the output of said receiver for indicating the receipt of said energy reflections, saw-tooth wave sweep generator means coupled to said indicator means and synchronized with said transmitter for producing a substantially uniform relatively slow speed trace of the electron beam of said indicator operable to spatially distribute in a uniform manner according to time of receipt substantially all the energy reflections received during the interval between successive impulses, sweep control means for said saw-tooth wave generator means for altering said slow speed trace to produce a substantially uniform high speed trace of the electron beam of said indicator, and means rendering said high speed sweep trace visible on the screen of said indicator only during a portion of the interval between successive impulses whereby only those impulses received coincident with said portion are indicated.

14. In an echo ranging device, an impulse transmitter adapted to emit a recurrent energy impulse, a receiver for receiving the reflections of said energy impulses, a cathode ray tube indicator means coupled to the output of said receiver for indicating the receipt of said energy reflections, saw-tooth wave sweep generator means coupled to said indicator means and synchronized with said transmitter for producing a substantially uniform relatively slow speed trace of the electron beam of said indicator operable to spatially distribute in a uniform manner according to time of receipt substantially all the energy reflections received during the interval between successive impulses, sweep control means for said saw-tooth wave generator means for altering said slow speed trace to produce a substantially uniform high speed trace of the electron beam of said indicator, means rendering said high speed sweep trace visible on the screen of said indicator only during a portion of the interval between successive impulses whereby only those impulses received coincident with said portion are indicated, and means operable to selectively control the time of occurrence of said portion in the interval between pulses.

15. Apparatus for recurrent signal analysis comprising, a cathode ray tube indicator means adapted to receive and visually display the signal to be analyzed, time base generator means synchronized with the recurrent signal to be analyzed coupled to said indicator for producing a substantially uniform relatively slow speed time base of the electron beam of said indicator operable to spatially distribute in a uniform manner according to occurrence time substantially all the signal elements which comprise the signal to be analyzed, time base control means for said time base generator means for altering said slow speed time base to produce a substantially uniform high speed time base of the electron beam of said indicator, and means rendering said high speed time base visible on said indicator only during a small portion of the signal being analyzed whereby only those signal elements coincident with said portion are indicated.

16. Apparatus for recurrent signal analysis comprising, a cathode ray tube indicator means adapted to receive and visually display the signal to be analyzed, time base generator means synchronized with the recurrent signal to be analyzed coupled to said indicator for producing a substantially uniform relatively slow speed time base of the electron beam of said indicator operable to spatially distribute in a uniform manner according to occurrence time substantially all the signal elements which comprise the signal to be analyzed, time base control means for said time base generator means for altering said slow speed time base to produce a substantially uniform high speed time base of the electron beam of said indicator, means rendering said high speed time base visible on said indicator only during a small portion of the signal being analyzed whereby only those signal elements coincident with said portion are indicated, and means operable to selectively control the time of occurrence of said portion during the occurrence of the signal to be analyzed.

ROBERT M. PAGE.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,231,929 | Lyman | Feb. 18, 1941 |
| 2,241,809 | De Forest | May 13, 1941 |
| 2,295,412 | Little | Sept. 8, 1942 |
| 2,300,189 | Wolff | Oct. 27, 1942 |
| 2,408,414 | Donaldson | Oct. 1, 1946 |
| 2,468,032 | Busignies | Apr. 26, 1949 |
| 2,471,516 | Bryant | May 31, 1949 |

FOREIGN PATENTS

| Number | Country | Date |
|---|---|---|
| 520,778 | Great Britain | May 3, 1940 |